(12) United States Patent
Nakajima et al.

(10) Patent No.: US 9,158,364 B2
(45) Date of Patent: Oct. 13, 2015

(54) TOUCH PAD MODULE AND ELECTRONIC DEVICE USING THE SAME

(71) Applicant: ROHM CO., LTD., Kyoto (JP)

(72) Inventors: Masao Nakajima, Kyoto (JP); Koki Okada, Kyoto (JP); Shigehide Yano, Kyoto (JP)

(73) Assignee: ROHM CO., LTD. (JP)

( * ) Notice: Subject to any disclaimer, the term of this patent is extended or adjusted under 35 U.S.C. 154(b) by 52 days.

(21) Appl. No.: 13/972,536

(22) Filed: Aug. 21, 2013

(65) Prior Publication Data

US 2014/0055410 A1 Feb. 27, 2014

(30) Foreign Application Priority Data

Aug. 22, 2012 (JP) ................. 2012-183618

(51) Int. Cl.
*G06F 1/16* (2006.01)
*G06F 1/32* (2006.01)
*G06F 3/044* (2006.01)

(52) U.S. Cl.
CPC .............. *G06F 1/3262* (2013.01); *G06F 1/169* (2013.01); *G06F 1/1694* (2013.01); *G06F 1/325* (2013.01); *G06F 3/044* (2013.01)

(58) Field of Classification Search
CPC ....... G06F 1/3262; G06F 1/325; G06F 1/169; G06F 1/1694; G06F 3/044
See application file for complete search history.

(56) References Cited

U.S. PATENT DOCUMENTS 5,386,219 A * 1/1995 Greanias et al. .............. 345/174
2010/0149127 A1* 6/2010 Fisher et al. .................. 345/174

* cited by examiner

*Primary Examiner* — Liliana Cerullo
(74) *Attorney, Agent, or Firm* — Cantor Colburn LLP (57) ABSTRACT

A touch pad module includes: a touch pad, a sensor group, a touch pad controller IC and a touch pad controller IC (Integrated Circuit). The touch pad has a touch surface touchable by a user. The sensor group is mounted on a mount surface of the touch pad. The sensor group includes at least one of an acceleration sensor, a gyro sensor and a geomagnetic sensor. The touch pad controller IC is mounted on the mount surface of the touch pad configured to control the touch pad and includes a detector, a digital processor and a first interface. The detector generates digital data representing an electrical state of the touch pad. The digital processor generates coordinate data representing coordinates touched by the user based on the digital data. The first interface transmits data between the digital processor and the outside of the touch pad controller IC.

7 Claims, 6 Drawing Sheets

TOUCH PAD MODULE AND ELECTRONIC DEVICE USING THE SAME

CROSS-REFERENCE TO RELATED APPLICATION(S)

This application is based upon and claims the benefit of priority from Japanese Patent Application No. 2012-183618, filed on Aug. 22, 2012, the entire contents of which are incorporated herein by reference.

TECHNICAL FIELD

The present disclosure relates to a touch panel and an electronic device using the same.

BACKGROUND

Figure 1:
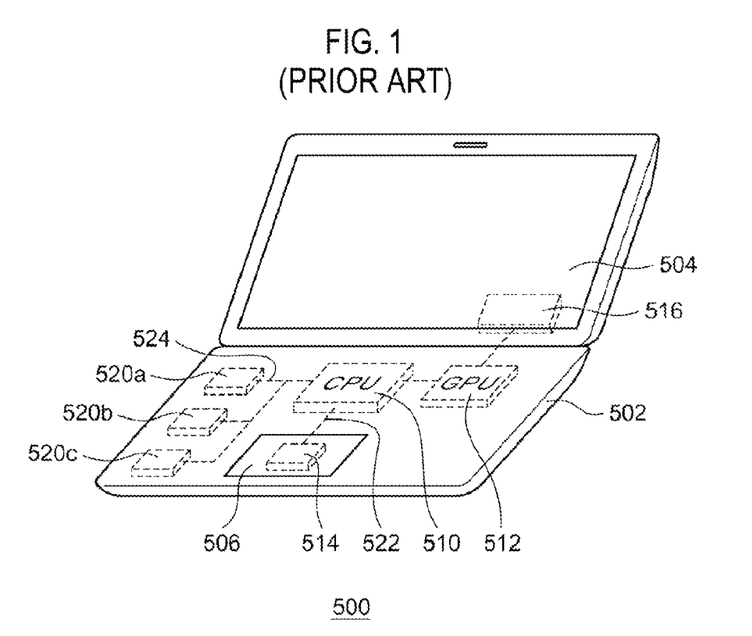
FIG. 1 is a perspective view showing a laptop PC as one example of an electronic device.

Recent electronic devices such as laptop personal computers (PCs), tablet PCs (also referred to as slate PCs), smart phones, high-performance audio players, personal digital assistants (PDAs) and so on have touch panels to operate the electronic devices through the touch of fingers or styluses to the touch panels. FIG. 1 is a perspective view showing a laptop PC 500 as one example of an electronic device. The laptop PC 500 includes a housing 502, a liquid crystal panel 504, a keyboard (not shown) and a touch pad 506. The housing 502 contains therein a central processing unit (CPU) 510, a graphics processing unit (GPU) 512, a touch pad controller 514 for controlling the touch pad 506, and a display controller 516 for controlling the liquid crystal panel 504.

The touch pad controller 514 is mounted on a mounting surface of the touch pad 506. The touch pad controller 514 controls and monitors a state of the touch pad 506 and determines a coordinate touched by a user. The touch pad controller 514 and the CPU 510 are interconnected via a first bus 522. Information on the presence of a touch contact by the user and the coordinate touched by the user are transmitted to the CPU 510 via the first bus 522.

For high-performance electronic devices such as the laptop PC 500 and so on, mounting a plurality of sensors such as an acceleration sensor 520a, a gyro sensor 520b, a geomagnetic sensor 520c and the like (hereinafter collectively referred to as a sensor group 520) on the devices is being progressed. The sensor group 520 may be connected to the CPU 510 via a second bus 524 different from the first bus 522.

With the configuration of FIG. 1, the sensor group 520 can be controlled to acquire information only while the CPU 510 is operating, but the sensor group 520 cannot be operated when the CPU 510 is in a standby state or a shut-down state. In other words, the CPU 510 is required to be activated to operate the sensor group 520, which may act as an obstacle for low power consumption.

SUMMARY

The present disclosure provides some embodiments of a touch pad module that is capable of low power consumption in electronic devices.

According to one embodiment of the present disclosure, there is provided a touch pad module including: a touch pad, a sensor group, a touch pad controller IC and a touch pad controller IC (Integrated Circuit). The touch pad has a touch surface that can be touched by a user. The sensor group is mounted on a mount surface of the touch pad opposite to the touch surface. The sensor group includes at least one of an acceleration sensor, a gyro sensor and a geomagnetic sensor, whose respective interfaces may be of the same type. The touch pad controller IC is mounted on the mount surface of the touch pad to control the touch pad and includes a detector, a digital processor and a first interface. The detector generates digital data representing an electrical state of the touch pad. The digital processor generates coordinate data representing a coordinate touched by the user based on the digital data. The first interface transmits data between the digital processor and the outside of the touch pad controller IC. The microcontroller IC is mounted on the mount surface of the touch pad and includes a second interface, a third interface, a fourth interface and a signal processor. The second interface is connected to the sensors included in the sensor group via a first bus. The third interface is connected to the first interface of the touch pad controller IC via a second bus. The fourth interface is connected to a CPU (Central Processing Unit) via a third bus. The signal processor is configured to control the sensor group through the second interface, acquire first data based on outputs of the sensors, control the touch pad controller IC through the third interface, acquire second data representing the coordinate touched by the user, and transmit the first data and the second data to the CPU via the fourth interface.

According to another embodiment of the present disclosure, there is provided a touch pad module including: a touch pad, a sensor group and a touch pad controller IC. The touch pad has a touch surface touched by a user. The sensor group is mounted on a mount surface of the touch pad opposite to the touch surface. The sensor group includes at least one of an acceleration sensor, a gyro sensor and a geomagnetic sensor, which may have their respective interfaces of the same type. The touch pad controller IC (Integrated Circuit) is mounted on the mount surface of the touch pad to control the touch pad and includes a detector, a fifth interface, a sixth interface and a digital processor. The detector generates digital data representing an electrical state of the touch pad. The fifth interface is connected to the sensors included in the sensor group via a fourth bus. The sixth interface is connected to a CPU (Central Processing Unit) via a fifth bus. The digital processor is configured to control the sensor group through the fifth interface, acquire first data based on outputs of the sensors, control the detector, acquire second data representing a coordinate touched by the user based on the digital data, and transmit the first data and the second data to the CPU via the sixth interface.

With this configuration, by placing the sensor group under control by the touch pad controller IC, the sensor group and the touch pad controller IC can be operated even when the CPU is in an inactive state and it is possible to reduce power consumption of the electronic device as compared to a case where the CPU is operated at all times. In addition, since the touch pad and the sensors are integrated into a module, there is no need for a designer of the electronic device to select the touch pad and the sensors individually and tune a layout or characteristics thereof, which can result in reduced design time of the electronic device.

In some embodiments, the touch pad may be of a mutual capacitance type. When the detector of the touch pad controller IC generates a pulse-like driving signal, the microcontroller IC can operate the touch pad controller IC and the sensor group so that the driving signal cannot interfere in the sensor group, which can result in high precision of detection.

According to another embodiment of the present disclosure, there is provided an electronic device including the above-described touch pad module or touch screen module.

Other aspects of the present disclosures may include any combinations of the above-described elements or conversion of expression of the present disclosure between methods, apparatuses and so on.

DETAILED DESCRIPTION

Preferred embodiments of the present disclosure will now be described in detail with reference to the drawings. Throughout the drawings, the same or similar elements, members and processes are denoted by the same reference numerals and explanation of which will not be repeated. The disclosed embodiments are provided for the purpose of illustration, not limitation, of the present disclosure and all features and combinations thereof described in the embodiments cannot be necessarily construed to describe the spirit of the present disclosure.

In the specification, the term □"touch pad"□ is intended to include a touch screen□ integrated with a display panel, in addition to being separated from the display panel. With this configuration, since the microcontroller IC having low power consumption may be placed between the CPU and the sensor group, and controls the sensor group and the touch pad controller IC, the sensor group and the touch pad controller IC can be operated even when the CPU is in an inactive state. In this manner, it is possible to reduce power consumption of the electronic device as compared to a case where the CPU is operated at all times. In addition, since the touch pad and the sensors are integrated into a module, the touch pad and the sensors need not be selected individually and tune a layout or characteristics thereof, which can result in easy design of the electronic device and reduction in design time.

In the specification, the phrase "connection of a member A and a member B" is intended to include direct physical connection of member A and member B as well as indirect connection thereof via other member as long as the other member has no substantial effect on the electrical connection of member A and member B or has no damage to functions and effects shown by a combination of member A and member B. Similarly, the phrase "interposition of a member C between a member A and a member B" is intended to include direct connection of member A and member C or direct connection of member B and member C as well as an indirect connection thereof via other member as long as the other member has no substantial effect on the electrical connection of member A, member B and member C or has no damage to functions and effects shown by a combination of member A, member B and member C.

First Embodiment

Figure 2:
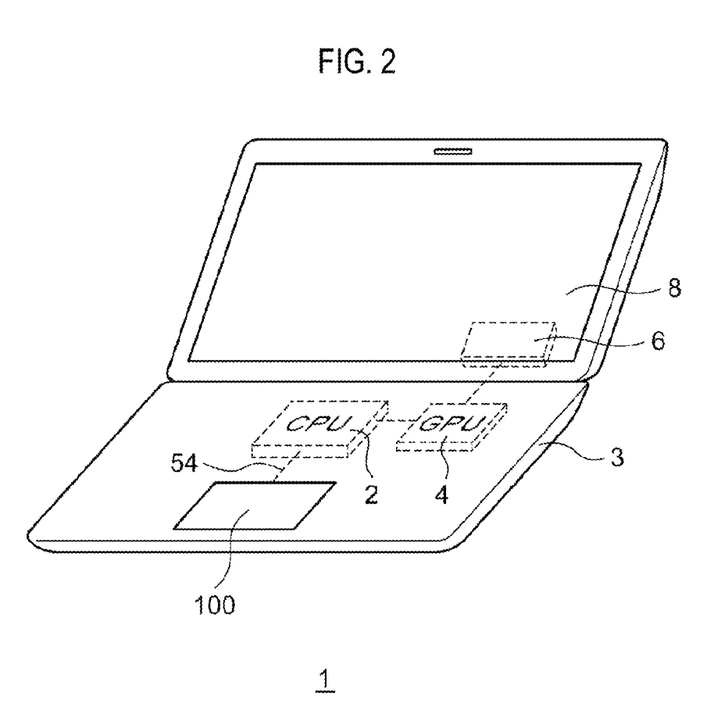
FIG. 2 is a view showing a configuration of an electronic device including a touch pad module according to a first embodiment.

FIG. 2 is a view showing a configuration of an electronic device 1 including a touch pad module 100 according to a first embodiment. An example of the electronic device 1 may include a laptop PC. The electronic device 1 includes a housing 3, a CPU (Central Processing Unit) 2, a GPU (Graphic Processing Unit) 4, a display driver 6, a display panel 8 and the touch pad module 100.

The CPU 2 is mounted on a mother board (not shown) and controls the entire operation of the electronic device 1. The GPU 4 generates image data to be displayed on the display panel 8. The GPU 4 may be incorporated into the CPU 2. The display driver 6 receives the image data generated by the GPU 4 and controls the display panel 8 based on the image data.

The touch pad module 100 is a user interface to receive various operation inputs from a user who touches the interface.

Figure 3:
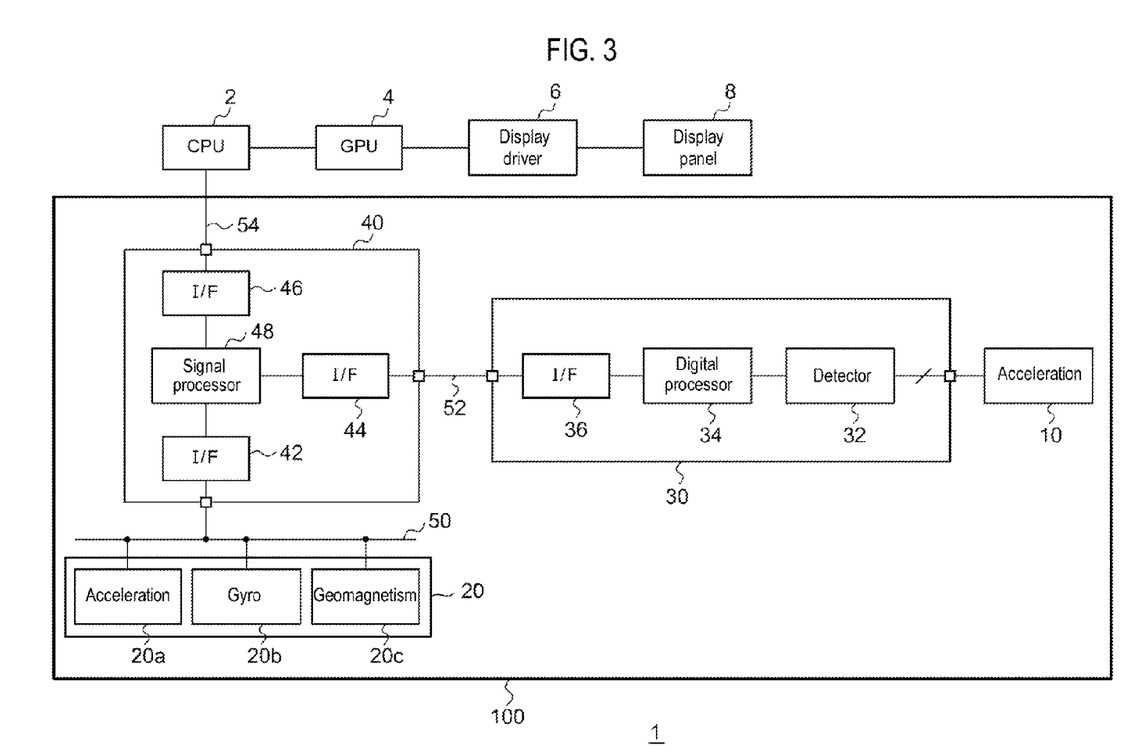
FIG. 3 is a block diagram showing a configuration of the electronic device according to the first embodiment.

FIG. 3 is a block diagram showing a configuration of the electronic device 1 according to the first embodiment. The touch pad module 100 includes a touch pad 10, a sensor group 20, a touch pad controller IC 30 and a microcontroller IC 40.

Figure 4A:
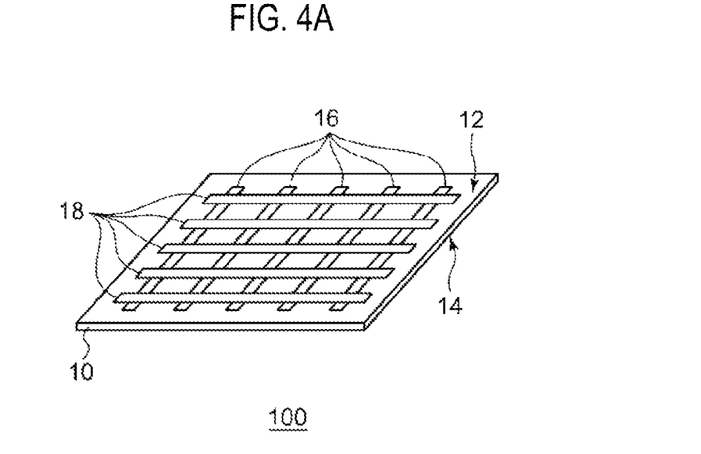
FIGS. 4A and 4B are views showing an external appearance of the touch pad module.
Figure 4B:
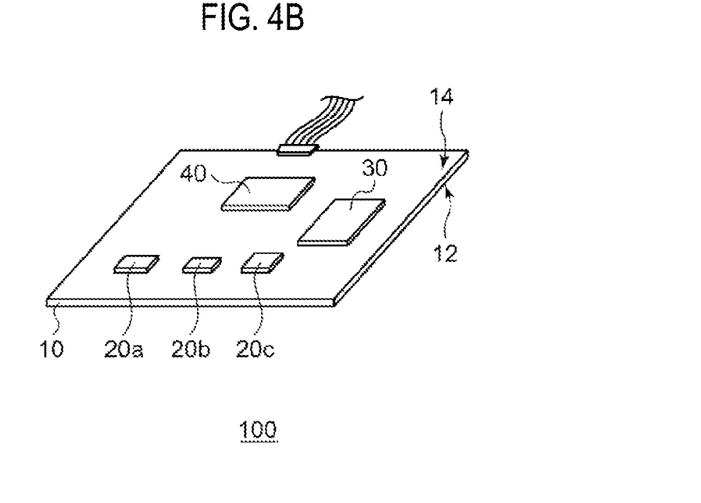

FIGS. 4A and 4B are views showing an external appearance of the touch pad module 100. As shown in FIG. 4A, the touch pad 10 has a touch surface 12 that a user may touch. For example, the touch pad 10 is of a capacitive type, specifically a mutual capacitive type, and includes a plurality of transmit electrodes 16 and receive electrodes 18 formed on the touch surface 12. The type of the touch pad 10 is not particularly limited but may be, for example, a self-capacitive type or a resistive type.

As shown in FIG. 4B, the sensor group 20, the touch pad controller IC 30 and the microcontroller IC 40 are mounted on a mount surface 14 of the touch pad 10 in the opposite to the touch surface 12.

The sensor group 20 includes at least one of an acceleration sensor 20a, a gyro sensor 20b and a geomagnetic sensor 20c. The acceleration sensor 20a, the gyro sensor 20b and the geomagnetic sensor 20c may have their respective interfaces of the same type.

The touch pad controller IC 30 includes, referring back to FIG. 3, a detector 32, a digital processor 34 and a first interface 36. The detector 32 controls the touch pad 10 and generates digital data representing an electrical state of the touch pad 10. A configuration of the detector 32 is not particularly limited but may employ techniques known in the art.

The digital processor 34 generates coordinate data representing a coordinate touched by a user based on the digital data. The first interface 36 is provided to transmit data between the digital processor 34 and the microcontroller IC 40.

The microcontroller IC 40 includes a second interface 42, a third interface 44, a fourth interface 46 and a signal processor 48. The second interface 42 is connected to the sensors 20a to 20c included in the sensor group 20 via a common first bus 50. The third interface 44 is connected to the first interface 36 of the touch pad controller IC 30 via a second bus 52. The fourth interface 46 may be connected to the CPU 2 via a third bus 54. The first bus 50, the second bus 52 and the third bus 54 are a PS/2 (Personal System/2) bus or a USB (Universal Serial Bus).

The signal processor 48 is configured to (i) control the sensor group 20 through the second interface 42 and the first bus 50 and acquire first data based on outputs of the sensors 20a to 20c, (ii) control the touch pad controller IC 30 through the third interface 44 and acquire second data representing a coordinate touched by a user, and (iii) transmit the first data and the second data to the CPU 2 via the fourth interface 46 and the third bus 54.

The above is the configuration of the touch pad module 100, according to some embodiments. Its operation will be subsequently described.

The microcontroller IC 40 is configured to independently operate irrespective of whether the CPU 2 is in an inactive state or an active state, and control the sensor group 20 and the touch pad controller IC 30. The inactive state of the CPU 2 may include a standby condition and a complete stop condition. Since the number of gates of the microcontroller IC 40 is much smaller than that of the CPU 2, it is to be noted that power consumption of the microcontroller IC 40 is sufficiently smaller than power consumption of the CPU 2.

Assume that the CPU 2 is now in an inactive state. The signal processor 48 of the microcontroller IC 40 controls the sensor group 20, detects acceleration, inclination and orientation of the electronic device 1, controls the touch pad controller IC 30 and detects the presence of touch of the touch pad 10 by a user and a coordinate on the touch pad 10 touched by the user.

For example, upon detecting that the user touches the touch pad 10, the microcontroller IC 40 notifies the CPU 2 of the fact that the user touches the touch pad 10 via the third bus 54. With this notification as a trigger, the CPU 2 can be transitioned from the inactive state to the active state.

Similarly, if the first data generated by the sensors 20a to 20c of the sensor group 20 satisfy a predetermined condition, the microcontroller IC 40 notifies the CPU 2 of the fact that the user touches the touch pad 10 via the third bus 54. With this notification as a trigger, the CPU 2 can be transitioned from the inactive state to the active state.

As a matter of course, even when the CPU 2 is in the active state, sensing by the touch pad 10 and the sensor group 20 is possible.

The above is the operation of the electronic device 1. In the touch pad module 100, the microcontroller IC 40 having low power consumption is placed between the CPU 2 and the sensor group 20 and the microcontroller IC 40, instead of the CPU 2, controls the sensor group 20 and the touch pad controller IC 30. This enables sensing by the sensor group 20 and the touch pad controller IC 30 even when the CPU 2 is in the inactive state. Previously, the CPU 2 had to be in the active state to operate the sensor group, which was an obstacle to low power consumption. In contrast, according to this embodiment, the microcontroller IC 40 can be designed to have lower power consumption than the CPU 2, which can result in reduction in the overall power consumption of the electronic device 1.

In addition, since the touch pad 10 and the sensor group 20 can be operated even when the CPU 2 is in the inactive state, a result of sensing by the touch pad 10 and the sensor group 20 can be used as a start/return signal from a shut-down state or a standby state of the electronic device 1. In general, a conventional electronic device having a dedicated power key or power button is started when a user pushes the power key or power button. In contrast, using the touch pad module 100 according to this embodiment, the touch pad 10 and the sensor group 20 can be used in addition to or as an alternative to the power key or power button, and accordingly, the dedicated power key or power button may be omitted.

In addition, since the touch pad 10 and the sensors 20a to 20c are integrated into the touch pad module 100, there is no need for a designer of the electronic device 1 to select the touch pad 10 and the sensors 20a to 20c individually and tune a layout or characteristics thereof, which can result in easy design of the electronic device and reduction in design time.

In addition, the electronic device 500 shown in FIG. 1 has the following problems. When the touch pad 506 is of a mutual capacitance type, the controller 514 generates a pulse-like driving signal. In the configuration of FIG. 1, since control of the touch pad 506 by the controller 514 and sensing by the sensor group 520 are independently performed in an asynchronous fashion, the driving signal generated by the controller 514 may have an adverse effect on the sensing of the sensor group 520. As a measure against this problem, there has been conventionally a need to select sensors having high noise resistance. In contrast, according to the touch pad module 100 of FIG. 3, the microcontroller IC 40 can operate the touch pad controller IC 30 and the sensor group 20 with different time slots in a time sharing manner so that the driving signal cannot interfere with the sensor group 20, which can result in high precision of detection.

In addition, from the viewpoint of thinness and design of the electronic device 1, the housing 3 may be made of metal. In the configuration of FIG. 1, when the housing 502 is made of metal, there is a possibility of reduction in sensitivity of the geomagnetic sensor 520c due to the metal shield. In contrast, in the electronic device 1 of FIG. 2, an opening of the housing 3 is formed at a place of the touch pad module 100 and the geomagnetic sensor 20c is arranged so as not to be affected by a metal shield, which can result in prevention of reduction in sensitivity of the geomagnetic sensor 20c.

Second Embodiment

Figure 5:
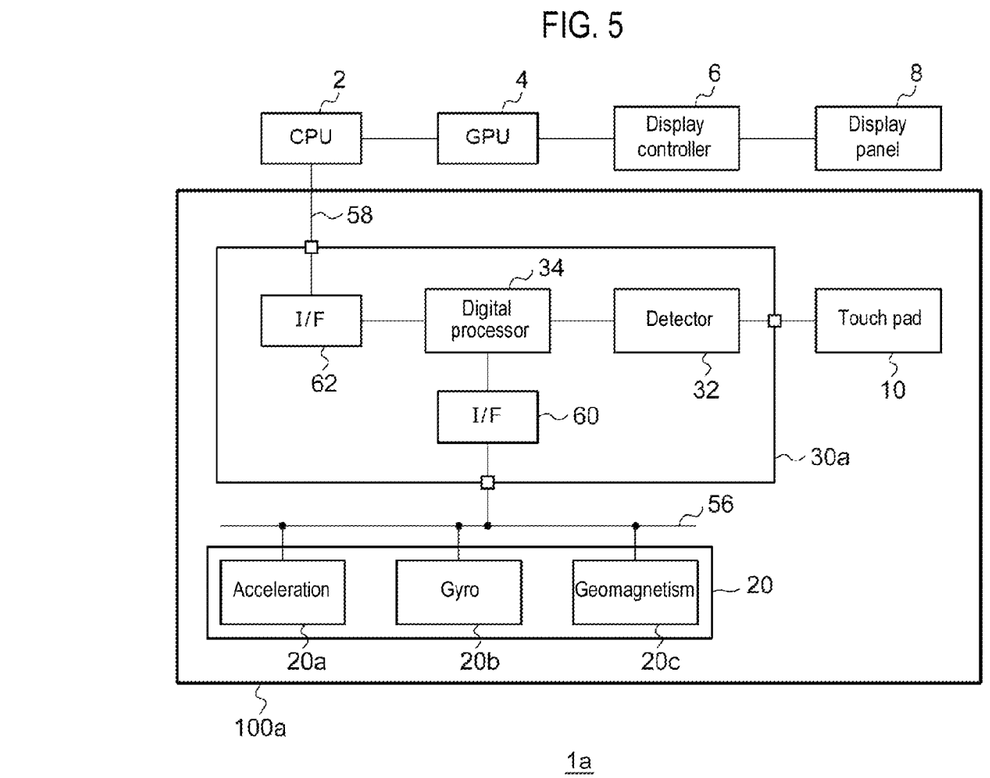
FIG. 5 is a block diagram showing a configuration of an electronic device including a touch pad module according to a second embodiment.

FIG. 5 is a block diagram showing a configuration of an electronic device 1a including a touch pad module 100a according to a second embodiment.

The touch pad module 100a includes a touch pad 10, a sensor group 20 and a touch pad controller IC 30a. Similarly to that shown in FIGS. 4A and 4B, the sensor group 20 and the touch pad controller IC 30a are mounted on a mount surface 14 of the touch pad 10.

The sensor group 20 includes at least one of an acceleration sensor 20a, a gyro sensor 20b and a geomagnetic sensor 20c. The acceleration sensor 20a, the gyro sensor 20b and the geomagnetic sensor 20c may have their respective interfaces of the same type.

The touch pad controller IC 30a includes a detector 32, a digital processor 34a, a fifth interface 60 and a sixth interface 62. The detector 32 controls the touch pad 10 and generates digital data representing an electrical state of the touch pad 10. The fifth interface 60 is connected to the sensors 20a to 20c included in the sensor group 20 via a common fourth bus 56. The sixth interface 62 is connected to the CPU 2 via a fifth bus 58. The digital processor 34a is configured to (i) control the sensor group 20 through the fifth interface 60 and acquire first data based on outputs of the sensors 20a to 20c, (ii) control the detector 32 and acquire second data representing a coordinate touched by a user based on digital data generated by the detector 32, and (iii) transmit the first data and the second data to the CPU 2 via the sixth interface 62. The digital processor 34a is configured to independently operate irrespective of whether the CPU 2 is in an inactive state or an active state, and control the detector 32 of the sensor group 20 and the touch pad controller IC 30a. Since the number of gates of the digital processor 34a is much smaller than that of the CPU 2, it is to be noted that power consumption of the digital processor 34a is sufficiently smaller than power consumption of the CPU 2.

In other words, in the touch pad module 100a, a portion of the digital processor 34 of the touch pad controller IC 30a has a function similar to that of the signal processor 48 of the microcontroller IC 40 of FIG. 3.

With the above described touch pad module 100a, since the sensor group 20 is placed under control by the touch pad controller IC 30a, sensing by the sensor group 20 and the touch pad controller IC 30a is enabled even when the CPU 2 is in the inactive state. In addition, the digital processor 34 of the touch pad controller IC 30a may be configured to have lower power consumption than the CPU 2. Thus, it is possible to reduce the overall power consumption of the electronic device 1, as compared to a case where the CPU 2 needs to be in operation at all times to enable sensing by the sensor group 20 and the touch pad controller IC 30a.

For the remaining elements of the second embodiment, they have the same effects as the corresponding elements of the first embodiment and thus, the descriptions of which will not be repeated.

The disclosed embodiments herein are merely examples and it is to be understood by those skilled in the art that combinations of elements and processes of the embodiments can be modified in various ways and such modifications fall within the scope of the present disclosure. The following descriptions are examples of such modifications.

First Modification

Figure 6A:
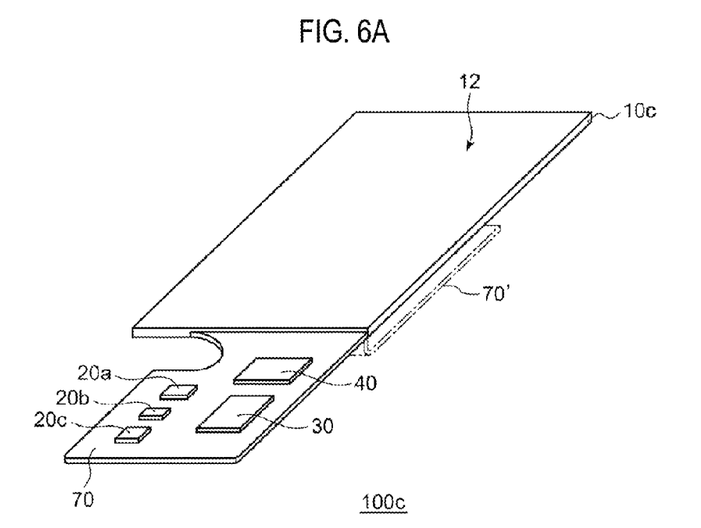
FIG. 6A is a view showing a touch pad module according to a first modification and FIG. 6B is a view showing a configuration of an electronic device including the touch pad module of FIG. 6A.

Although an electronic device including a touch pad has been illustrated in the above embodiments, it will be appreciated that such touch pad can include a touch screen. FIG. 6A is a view showing a touch pad module 100c according to a first modification and FIG. 6B is a view showing a configuration of an electronic device 1c including the touch pad module 100c of FIG. 6A.

The touch pad module 100c of FIG. 6A includes a touch pad (touch screen) 10c, a flexible print board (FPC) 70, a sensor group 20, a touch pad controller IC 30 and a microcontroller IC 40, all of which are integrated in a module. The touch pad module 100c can be understood to replace the touch screen 10c for the touch pad 10 of the touch pad module 100 of FIG. 3. The FPC 70 is connected to the touch screen 10c. The sensor group 20, the touch pad controller IC 30 and the microcontroller IC 40 are mounted on the FPC 70. The sensor group 20, the touch pad controller IC 30 and the microcontroller IC 40 may be mounted on one surface of the FPC 70. The FPC 70 may be bent into a folded state 70' as indicated by broken lines in FIG. 6A.

Figure 6B:
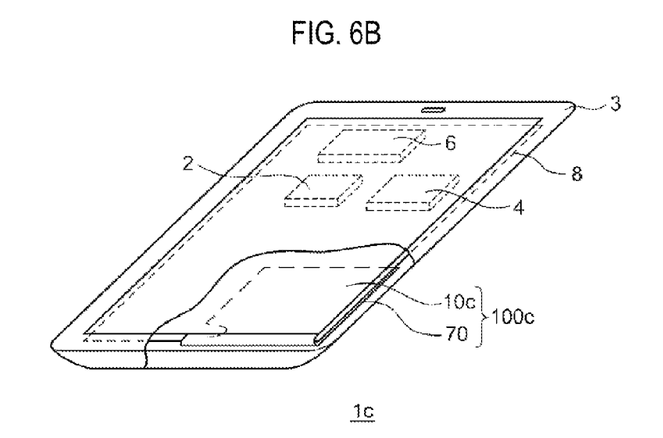

FIG. 6B shows a state of mounting of the touch pad module 100c on the electronic device 1c. The touch screen 10c is placed on a top of a display panel 8 and the flexible print board 70 is bent to a lower side of the display panel 8 such that the display panel 8 is inserted between the flexible print board 70 and the touch pad 10.

Second Modification

In the touch pad module 100a of FIG. 5, the touch pad 10 may be replaced with a touch screen 10c. In this case, the touch screen 10c may have the same structure as the touch pad 10c of FIGS. 6A and 6B.

The first and second modifications can obtain the same effects as the above embodiments. In addition, the touch pad modules according to the first and second modifications can be applied to the electronic device as shown in FIG. 2, without being limited to the case where the touch pad is a touch screen. That is, the sensor group 20, the touch pad controller IC 30 and the microcontroller IC 40 may be mounted on either the mount surface of the touch pad 10 or the FPC 70.

According to the present disclosure in some embodiments, it is possible to provide a touch pad module which is capable of operating the sensor group and the touch pad controller IC even when the CPU is in the inactive state, thereby reducing power consumption.

While certain embodiments have been described, these embodiments have been presented by way of example only, and are not intended to limit the scope of the disclosures. Indeed, various methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A touch pad module comprising:
   a touch pad having a touch surface configured to be touchable by a user;
   a sensor group mounted on a mount surface of the touch pad in the opposite to the touch surface, the sensor group including at least one of an acceleration sensor, a gyro sensor and a geomagnetic sensor;
   a touch pad controller IC (Integrated Circuit) mounted on the mount surface of the touch pad and configured to control the touch pad, the touch pad controller IC including a detector configured to generate digital data representing an electrical state of the touch pad, a digital processor configured to generate coordinate data representing a coordinate touched by the user based on the digital data, and a first interface configured to transmit data from the digital processor to the outside of the touch pad controller IC; and
   a microcontroller IC mounted on the mount surface of the touch pad, the microcontroller IC including a second interface connected to the sensors included in the sensor group via a first bus, a third interface connected to the first interface of the touch pad controller IC via a second bus, a fourth interface connected to a CPU (Central Processing Unit) via a third bus, and a signal processor configured to control the sensor group through the second interface, acquire first data based on outputs of the sensors, control the touch pad controller IC through the third interface, acquire second data representing the coordinate touched by the user, and transmit the first data and the second data to the CPU via the fourth interface.

2. The touch pad module of claim 1, wherein the touch pad is of a mutual capacitance type.

3. The touch pad module of claim 1, wherein the touch pad is of a self-capacitance type.

4. The touch pad module of claim 1, wherein the touch pad is of a resistive film type.

5. An electronic device comprising a touch pad module of claim 1.

6. A touch pad module comprising:
   a touch pad having a touch surface touchable by a user;
   a foldable flexible print board connected to the touch pad;
   a sensor group mounted on the flexible print board, the sensor group including at least one of an acceleration sensor, a gyro sensor and a geomagnetic sensor;
   a touch pad controller IC (Integrated Circuit) mounted on the flexible print board and configured to control the touch pad, the touch pad controller IC including a detector configured to generate digital data representing an electrical state of the touch pad, a digital processor configured to generate coordinate data representing a coordinate touched by the user based on the digital data, and a first interface configured to transmit data from the digital processor to the outside of the touch pad controller IC; and a microcontroller IC (Integrated Circuit) mounted on the flexible print board, the microcontroller IC including a second interface connected to the sensors included in the sensor group via a first bus, a third interface connected to the first interface of the touch pad controller IC via a second bus, a fourth interface connected to a CPU (Central Processing Unit) via a third bus, and a signal processor configured to control the sensor group through the second interface, acquire first data based on outputs of the sensors, control the touch pad controller IC through the third interface, acquire second data representing the coordinate touched by the user, and transmit the first data and the second data to the CPU via the fourth interface.

7. An electronic device comprising:
a display panel; and
a touch pad module of claim 6,
wherein the touch pad of the touch pad module is provided to overlap with the display panel and acts as a touch screen, and
wherein the flexible print board is folded such that the display panel is disposed between the flexible print board and the touch panel.

\* \* \* \* \*